H. Gortner,
Cage Trap.
No 23,917.  Patented May 10, 1859.
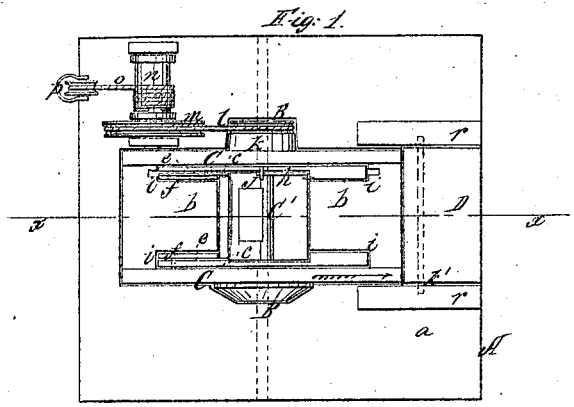
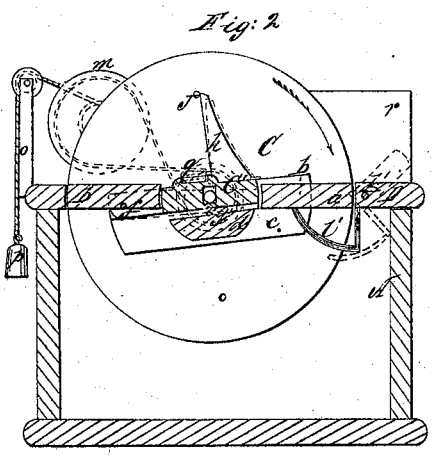
Witnesses:
John C. Gregg
W. W. Sherman
Inventor:
Henry Gortner

UNITED STATES PATENT OFFICE.

HENRY GORTNER, OF IRVILLE, OHIO.

RAT-TRAP.

Specification of Letters Patent No. 23,917, dated May 10, 1859.

*To all whom it may concern:*

Be it known that I, HENRY GORTNER, of Irville, in the county of Muskingum and State of Ohio, have invented a new and Improved Trap for Catching Rats and other Animals; and I do hereby declare that the following is a full, clear, and exact description of the same, reference being had to the annexed drawings, making a part of this specification, in which—

Figure 1, is a plan or top view of a trap constructed according to my invention. Fig. 2, a side sectional view of ditto taken in the line $x, x$, Fig. 1.

Similar letters of reference indicate corresponding parts in the two figures.

This invention relates to an improved trap of that class that are self-setting and consists in the employment or use of a treadle and bait platform arranged in connection with a supplemental platform and revolving disks and a box, substantially as hereinafter described, whereby a very efficient, simple and durable trap is obtained, possessing advantages over all others of a similar kind that have passed under my observation.

To enable those skilled in the art to fully understand and construct my invention I will proceed to describe it.

A, represents a rectangular box, in the cover $a$, of which stationary horizontal shafts B, B, are placed. On each shaft B, a circular disk C, is placed loosely. The disks being a suitable distance apart, and connected by two radial plates $b, b$, which extend from the peripheries of the disks to points about midway between their peripheries and centers, the radial plates being in the same plane.

Between the two shafts B, B, two plates $c, c$, connected by a block $d$, are placed, and permanently secured to the shafts, and between the two plates $c, c$, a treadle and bait platform C′, is placed, said platform C′, having a plate or bar $e$, attached to each side of it, the ends of which plates or bars are pivoted in one end of the plates $c, c$, as shown at $f$. The platform C′, rests on springs $g$, attached to the block $d$, which connects the plates $c, c$, the plates or bars $e$, being employed in order to obtain a greater leverage for the treadle platform C′. To one side of the treadle platform C′, a vertical plate $h$, is attached, the use of which will be presently seen.

In each side of the plates $b, b$, a recess $i$, is made to receive the plates $c, c$, as shown clearly in Fig. 1, and to allow the disks and their plates $b, b$, to rotate without interfering with the plates $c, c$. To the inner side of one of the disks C, horizontal pins $j, j$, are attached, and to the outer side of the disk C, a concentric pulley $k$, is secured, said pulley having a cord $l$, passing around it and around a ratchet drum $m$, to the shaft $n$, of which a cord $o$, and weight $p$, is attached. The pins $j$, when the treadle platform C′, is raised, bear alternately against the plate $h$, which serves as a stop preventing the rotation of the disks C, C, and the pins $j$, are secured to their disks C, at such points as to retain the plates $b, b$, nearly or quite in the plane of the treadle platform C′.

The disks C, C, are fitted in an opening in the cover $a$, and in the top of the box in line with the plates $b, b$, and treadle platform C′, a supplemental platform D, is attached. This platform is pivoted in the cover $a$, as shown at $k'$, and it has a curved rod $l'$, attached to its under side which rod bears against the under side of the plate $b$, above it, as shown clearly in Fig. 2.

The operation is as follows:—The bait $q$, shown in red, is attached to the treadle platform C′, and the trap is so set that the animals in order to reach the bait must pass over the supplemental platform D, and between side boards $r, r$, which are placed at each side of the platform D. The animal in attempting to reach the bait $q$, depresses the platform C′, and thereby frees the upper pin $j$, from the plate or stop $n$, the latter dropping below the pin, and the weight $p$, then rotates the disks C, C, one half a revolution, the animal being thrust down into the box A, by the action of the plate $b$, that was in front of him, the plate $b$, behind the animal tilting the platform D, as shown by the red dotted lines, said platform serving as a guard and preventing the escape of the animal. The movement of the disks C, are confined to have a revolution by means of the two pins $j, j$, which alternately catch against the plate $h$.

I do not confine myself to the employment or use of a weight to actuate the disks C, C, for a spring might be used instead and answer a good purpose although I prefer a weight on account of obtaining a constant power and also on account of the liability of the spring to rust. The trap, it will be seen sets itself until the weight has run down.

This trap is extremely simple, an animal in springing the trap cannot escape, the supplemental platform D, serving as a guard to prevent such a contingency. The device is also durable and may be furnished at a reasonable cost.

Having thus described my invention what I claim as new and desire to secure by Letters Patent, is,

The rotating disks C, C, connected by the plates $b$, $b$, in connection with the treadle platform C', plates $c$, $c$, and bar $d$, and the supplemental platform D, the whole being fitted to the box A, and arranged to operate as and for the purpose set forth.

HENRY GORTNER.

Witnesses:
JOHN C. GREGG,
U. W. SHERRARD.